US008571725B2

(12) United States Patent
Juzswik

(10) Patent No.: US 8,571,725 B2
(45) Date of Patent: Oct. 29, 2013

(54) APPARATUS FOR LOCATING A VEHICLE ELECTRONIC KEY

(75) Inventor: David L. Juzswik, Commerce Township, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 873 days.

(21) Appl. No.: 12/361,880

(22) Filed: Jan. 29, 2009

(65) Prior Publication Data

US 2010/0191392 A1 Jul. 29, 2010

(51) Int. Cl.
*G05D 1/00* (2006.01)

(52) U.S. Cl.
USPC .......................................................... 701/2

(58) Field of Classification Search
USPC ............ 340/992, 5.61, 5.72, 10.1, 5.1; 701/2; 455/73, 277.1; 307/10.2
See application file for complete search history.

(56) References Cited

U.S. PATENT DOCUMENTS

| 6,522,027 | B1 | 2/2003 | Morillon et al. |
|---|---|---|---|
| 6,906,612 | B2 | 6/2005 | Ghabra et al. |
| 7,042,342 | B2 | 5/2006 | Luo et al. |
| 7,046,119 | B2 | 5/2006 | Ghabra et al. |
| 7,224,980 | B2 | 5/2007 | Hara |
| 7,305,284 | B2 | 12/2007 | Teshima et al. |
| 7,319,875 | B2 | 1/2008 | Brand et al. |
| 7,388,466 | B2 | 6/2008 | Ghabra et al. |
| 2006/0017550 | A1 | 1/2006 | Yoshida et al. |
| 2006/0114100 | A1* | 6/2006 | Ghabra et al. ................ 340/5.61 |
| 2007/0162191 | A1* | 7/2007 | Matsubara et al. ............... 701/1 |
| 2009/0264082 | A1* | 10/2009 | Tieman et al. .................. 455/73 |
| 2010/0171642 | A1* | 7/2010 | Hassan et al. ................. 340/992 |

FOREIGN PATENT DOCUMENTS

| EP | 1 101 887 A2 | 5/2001 |
|---|---|---|
| JP | 2007-146396 A | 6/2007 |

OTHER PUBLICATIONS

A International Search Report dated Aug. 13, 2010 for PCT International Application No. PCT/US2010/021781, filed Jan. 22, 2010.

* cited by examiner

*Primary Examiner* — James Trammell
*Assistant Examiner* — Michael D Lang
(74) *Attorney, Agent, or Firm* — Tarolli, Sundheim, Covell & Tummino LLP

(57) ABSTRACT

An apparatus is provided for locating a vehicle electronic key including a fob for receiving a low frequency signal, measuring the low frequency signal strength, and providing a radio frequency response signal, a portion of the response signal including the signal strength determination. A low frequency antenna is located within the vehicle cabin for providing the low signal. A controller receives the response signal and compares the signal strength against a predetermined threshold. A vehicle engine immobilizer is responsive to the controller where the controller controls the immobilizer in response to the comparison.

7 Claims, 3 Drawing Sheets

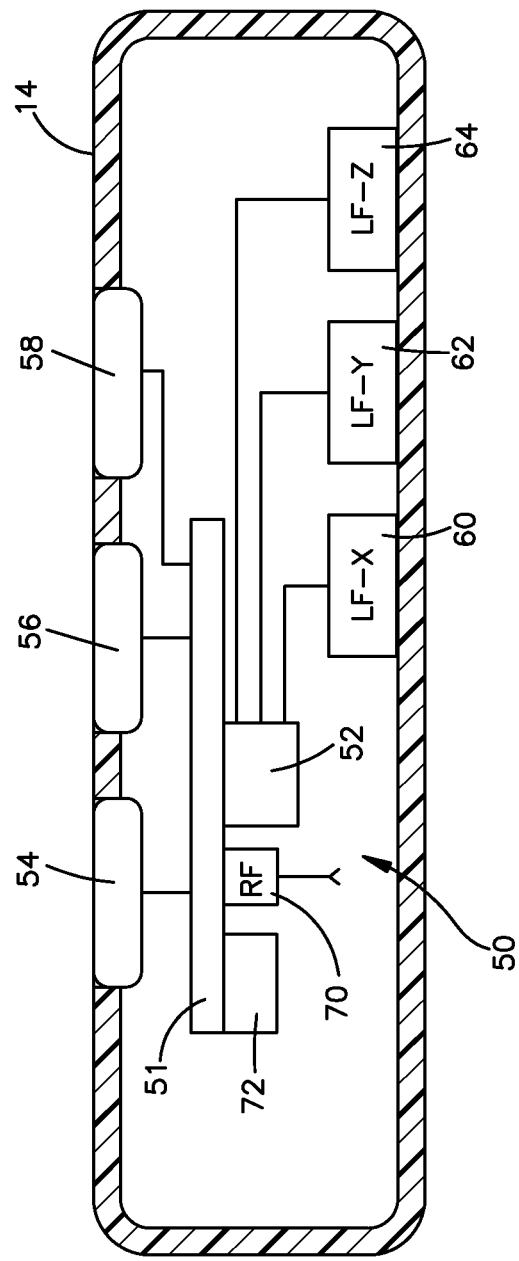

APPARATUS FOR LOCATING A VEHICLE ELECTRONIC KEY

TECHNICAL FIELD

The present invention relates to vehicle electronic key systems and is particularly directed to an apparatus for locating a vehicle electronic key and determining whether the electronic key is inside or outside of the vehicle's cabin.

BACKGROUND

Vehicle entry and ignition systems that use a unique, physical key to enter and start the vehicle engine are well known in the art. Also, electrical fobs that wirelessly transmit an electrical signal such as a radio frequency ("RF") signal for controlling locking and unlocking functions of the vehicle doors are known. Recently, passive keyless systems have been developed for vehicles that include a fob carried by a vehicle operator that control door lock/unlock functions and engine immobilization automatically in response to the presence of the fob. As the operator approaches the vehicle and touches a portion of the vehicle, such as the door handle, the vehicle lock/unlocking system automatically sends an interrogation signal to the fob and monitors for a fob response signal. Once identification and authentication occurs between the vehicle system and fob, and if authentication is accomplished, the door is unlocked. Once inside the vehicle, if the fob carried by the operator is the correct fob associated with that vehicle, the vehicle can be started with a simple pushing of a start button located on the vehicle dash, i.e., no form of physical key is needed to start the vehicle. Such systems have become known as "keyless-go" ignition systems.

As part of the authentication process between the vehicle system and the fob, identification ("ID") codes are sent and compared. For example, the fob may send a coded ID signal via RF to an on-board vehicle system. The on-board vehicle system determines if the received ID code is a valid ID from a fob associated with that vehicle. If the ID code is a valid code, as determined via a comparison against a prestored code, the vehicle will be able to start when the start button is pushed. If the received ID code is not valid, i.e., the received code does not match the prestored code, the vehicle engine is immobilized.

SUMMARY OF THE INVENTION

In accordance with the present invention, an apparatus is provided for locating an electronic key in a vehicle system and determining if the electronic key is inside the vehicle cabin or outside of the vehicle cabin.

In accordance with one example embodiment of the present invention, an apparatus is provided for locating a vehicle electronic key including a fob for receiving a low frequency signal, measuring the low frequency signal strength, and providing a radio frequency response signal, a portion of the response signal including the signal strength determination. A low frequency antenna is located within the vehicle cabin for providing the low signal. A controller receives the response signal and compares the signal strength against a predetermined threshold. A vehicle engine immobilizer is responsive to the controller where the controller controls the immobilizer in response to the comparison.

In accordance with another example embodiment of the present invention, an apparatus is provided for locating a vehicle electronic key comprising a fob having a low frequency antenna in three coordinates for receiving a low frequency signal and providing three measured low frequency signal strength values. The fob further includes means for determining a single value signal strength of the monitored low frequency field and provides a radio frequency signal that includes the low frequency signal strength signal information. A low frequency transmitter is located within the vehicle cabin for providing a low frequency signal though out a cabin of a vehicle. A controller for storing a premeasured low frequency signal strength map of the vehicle cabin is provided and compares the measured signal strength signal against the stored premeasured low frequency signal strength map of the vehicle cabin to determine if the fob is inside of the vehicle cabin. A vehicle engine immobilizer is responsive to the controller. The controller controls the immobilizer in response to the comparison.

In accordance with another example embodiment of the present invention, an apparatus is provided for locating a vehicle electronic key comprising a low frequency transmitter for transmitting a low frequency energy signal in the vehicle of a cabin and an electron vehicle key for receiving the low frequency energy signal, measuring the low frequency energy signal strength, and transmitting a radio frequency signal having a unique identification code and a field strength code. A controller connects to the vehicle ignition system for monitoring the radio frequency signal and enabling the vehicle ignition system only if the identification code matches a prestored code and the field strength code indicates, via a threshold comparison, that the electronic key is inside of the vehicle cabin.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 3 is a side view partially in section of the fob shown in FIG. 1 and made in accordance with one example embodiment of the present invention.

DETAILED DESCRIPTION

Figure 1:
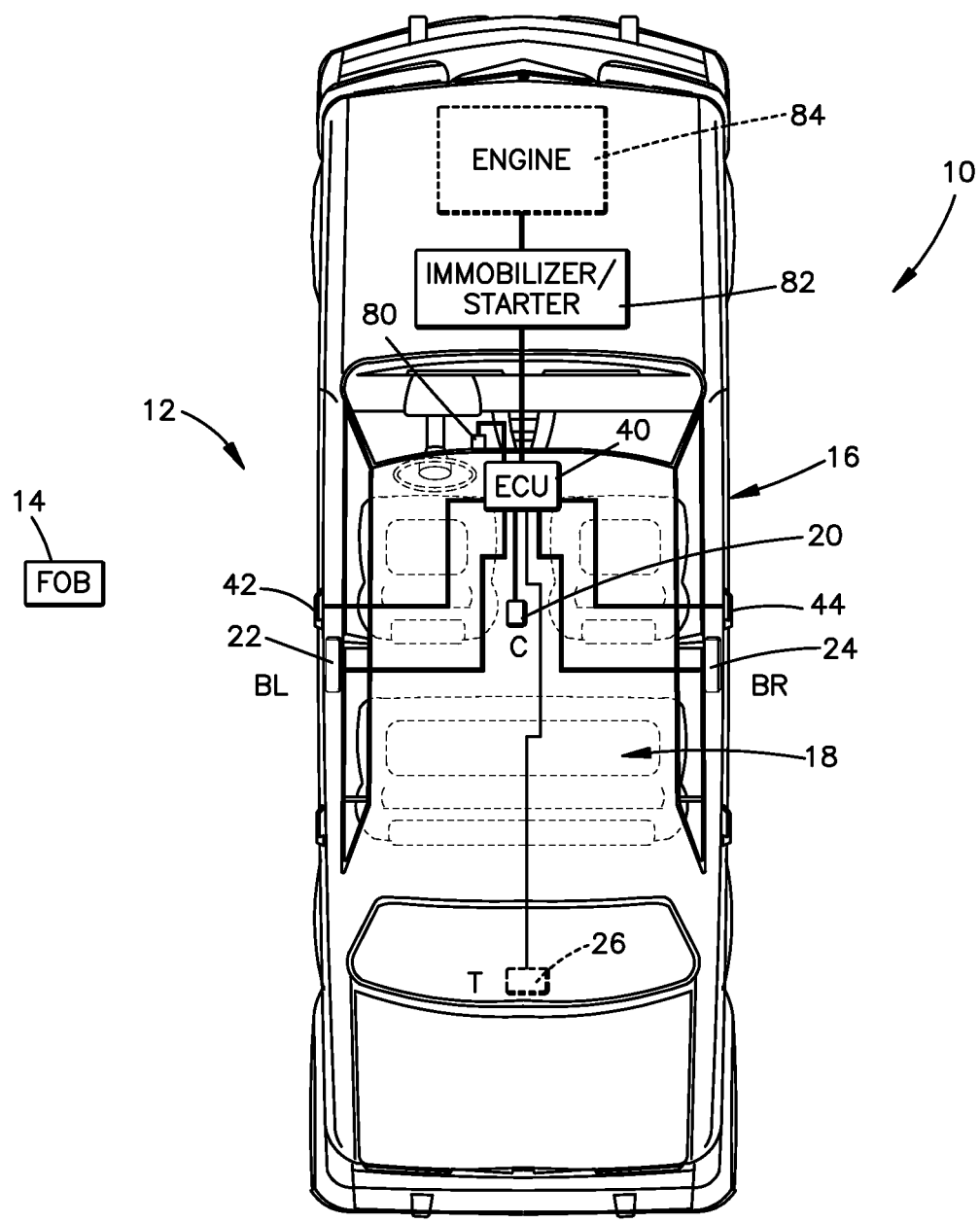
FIG. 1 is a top plan view of a vehicle having an apparatus for locating a vehicle electronic key in accordance with one example embodiment of the present invention.

Referring to FIG. 1, a vehicle 10 includes an electronic key system 12 for locating a vehicle electronic key in accordance with one example embodiment of the present invention. The electronic key system 12 provides passive entry unlocking and locking of the vehicle entry points and also permits passive starting of the vehicle ignition system by simply pushing a start button on the vehicle dashboard as described below.

The electronic key system 12 includes a fob 14 carried by the vehicle operator and a vehicle system 16 mounted in the vehicle 10. The vehicle system 16 includes a plurality of low frequency ("LF") transmission antennas arranged to provide the interior cabin 18 of the vehicle 10 with a LF interrogation signal. Specifically, a central LF antenna 20 is located near a console of the vehicle. A first B-pillar LF antenna 22 is located in the driver's b-pillar of the vehicle 10. A second B-pillar LF antenna 24 is located in the passenger's B-pillar of the vehicle 10. A trunk LF antenna 26 is located in the trunk of the vehicle 10. The distance traveled by the LF signals by each of antennas is relatively short. The strength of the LF field transmitted by any of the LF antennas 20, 22, 24, and 26 decreases as the inverse cube of the distance.

Figure 2:
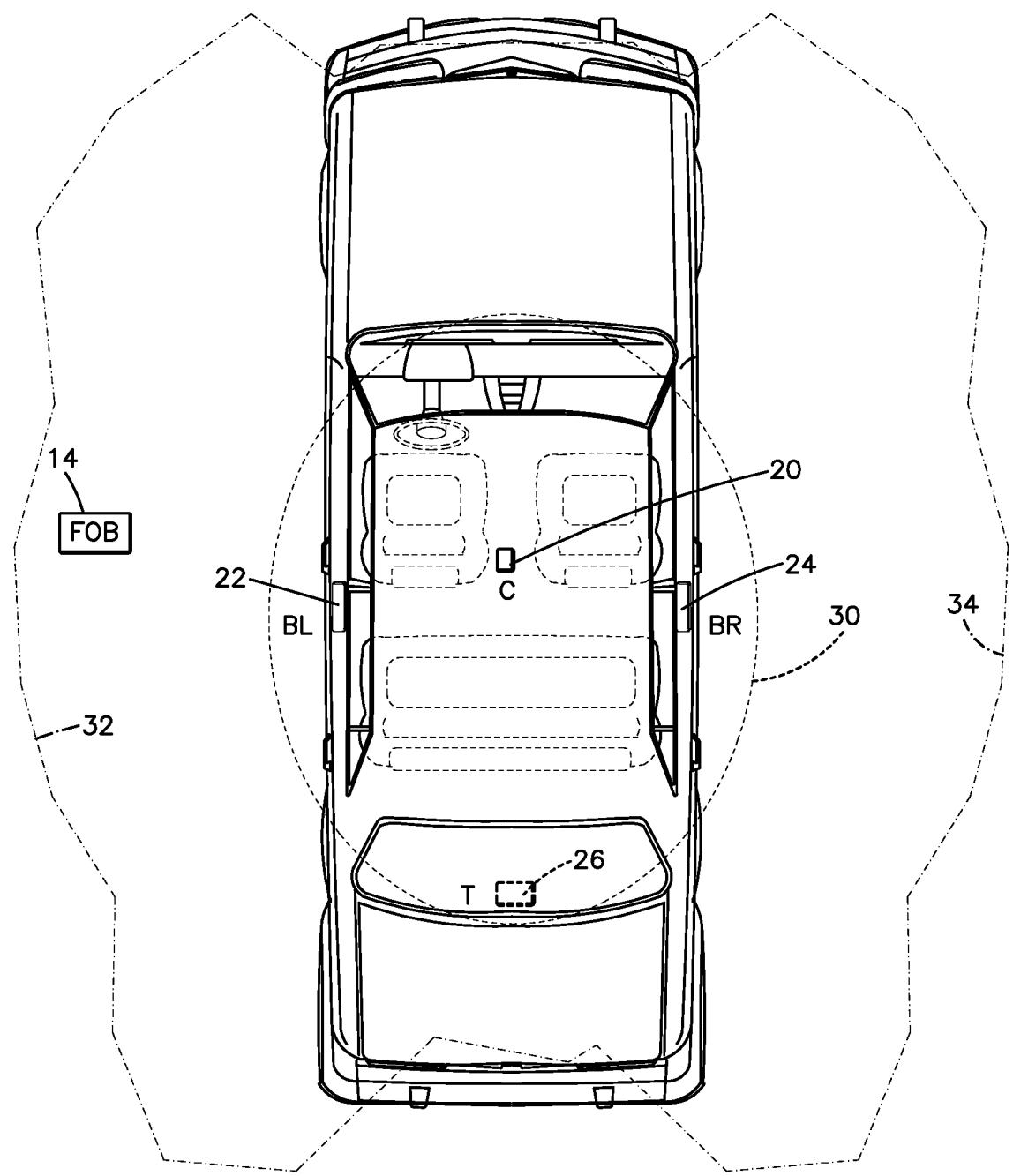
FIG. 2 is a top plan view similar to FIG. 1 showing the approximate extent of the LF fields provided by the LF antennas of FIG. 1.

Referring to FIG. 2, a field pattern 30 can be seen generated by the LF antenna 20 from the console location. The outer field 32 can be seen generated by the LF antenna 22 from the B-pillar on the driver's side of the vehicle. The outer field 34 can be seen generated by the LF antenna 24 from the B-pillar on the passenger's side of the vehicle. The field by the trunk LF antenna 26 is, for the most part, confined to the interior of the vehicle (as long as the trunk lit remains closed) and into the cabin 18 covering the rear package shelf.

Referring again to FIG. 1, the LF antennas 20, 22, 24, and 26, are connected to an electronic control unit ("ECU") 40 for controlling the energization of the LF antennas. The ECU 40 is also connected to a sensor 42 in the driver's door handle and a sensor 44 in the passenger's door handle. Whenever the door handles 42 or 44 have been touched, the ECU 40 will activate the associated LF antenna 22 or 24 to provide a LF interrogation signal so as to determine if a fob 14 is in proximity to the outside of the vehicle. The ECU also includes a radio frequency ("RF") receiver for receiving a response signal from the fob 14. After an interrogation signal is received by a fob associated with the vehicle, it provides a RF response signal having the appropriate ID code that is then received by the ECU RF receiver. If the code matches a prestored code, the ECU 40 will send an unlock signal to the door unlocking devices to unlock the vehicle door locks.

Referring to FIG. 3, the fob 14 includes electronic circuitry 50 mounted on a printed circuit board ("PCB") 51 including a microcontroller 52 for controlling the fob's several functions. Those skilled in the art will appreciate that the control functions of the fob 14 could also be accomplished using discrete circuitry or an application specific integrated circuit ("ASIC"). The fob 14 includes several buttons 54, 56, and 58 that a vehicle operator could use could to control vehicle convenience functions controlled by the fob 14 such as door locking/unlocking, etc.

The fob 14 includes three LF antennas oriented to detect LF energy relative to a self defined X, Y, Z coordinate system. In particular, LF antenna 60 detects LF-X, antenna 62 detects LF-Y, and antenna 64 detects LF-Z. To establish a LF intensity value, the controller 52 takes each of the values measured by LF-X, LF-Y, and LF-Z, squares them and then sums the squares. This will be referred to herein as the LF sum of the squares.

The fob 14 further includes an RF transmitter 70. When the fob 14 receives an LF interrogation signal from one of the associated vehicle B-pillar antennas 22 or 24, it responds by transmitting a ("RF") response signal that is received by the ECU 40. All of the electronic circuitry of the fob 14 is powered by an internal battery 72.

Referring again to FIG. 1, as part of the keyless-go system of the vehicle, a push button ignition module 80 is connected to the ECU 40. The ECU 40 is connected to an engine immobilizer/starting circuitry 82 that is, in turn, operatively coupled to the vehicle engine 84. If an associated E-key, i.e., fob 14 is located within the cabin 18 and has been verified by the ECU 40, the ECU 40 will disable the immobilizer 82 so that pushing of the start button on the ignition module 80 will allow the engine 84 to start.

In accordance with one example embodiment of the present invention, once the ECU 40 unlocks the vehicle doors (using LF signals generated by the B-pillar LF antennas 22 or 24), and upon activation of the start button 80, only the console LF antenna 20 is energized to provide an LF interrogation signal 30 predominately on the inside of the vehicle cabin 18. The controller 52 uses the LF-X antenna 60, the LF-Y antenna 62, and the LF-Z antenna 64 to measure the LF field strength by squaring each of the intensity signals and summing the squares. In effect, the controller 52, via an RSSI circuit technique determines signal strength of the LF field.

For each vehicle platform for which the present invention is to be used, a LF field is generated by the console antenna 20. At a plurality of X, Y, and Z points within and exterior to the vehicle cabin 18, the LF field strength is measured and mapped. This measured field strength map is then stored in the ECU 40 with the intention to define an inside the vehicle determination for immobilization deactivation, that only extends beyond the side door glass by less than 20 cm. The RSSI field strength measured and transmitted by the fob 14 via RF to the ECU 40 is then compared against the prestored LF field strength map in the ECU 40 so that the ECU can make a determination as to whether the fob 14 is inside of the cabin 18 or outside of the cabin 18. For example, it may be determined that at a minimum, all LF field strength readings inside of the cabin 18 from the predetermined measurements always are greater than 3 and greater than 20 cm outside of the cabin are less than 3. If the fob sends a RF field strength reading of 4, the ECU "knows" that the fob is inside of the cabin 18 and will disable the immobilizer 82. If the fob sends a RF field strength reading of 1, the ECU "knows" that the fob is greater than 20 cm outside of the cabin 18 and will not disable the immobilizer 82. Again, the prestored mapping of the field strength of the cabin 18 is platform dependent and is performed empirically.

If the console antenna 20 does not provide sufficient coverage within the cabin 18, it is possible to use a trunk antenna 26. Such antenna would not be energized at the same time as the console antenna but alternatively with the console antenna. The trunk antenna field has been found to not generate a field much beyond the rear area of the trunk as long as the trunk lid is down.

Alternatively, the two side pillar antennas could also be used in a sequential energization by using a field strength mapping and triangulation technique to locate the position of the fob within or outside of the cabin 18, and utilizing a multiple antenna map.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for locating a vehicle electronic key for a vehicle, the apparatus comprising:

a fob for receiving a low frequency signal, determining a low frequency signal strength value of the received low frequency signal, and providing a radio frequency response signal, a portion of the response signal including the determined low frequency signal strength value;

a low frequency antenna located at or near a central location of a cabin of the vehicle for providing the low frequency signal substantially throughout and substantially within the cabin of the vehicle;

a controller for receiving the radio frequency response signal from the fob, comparing the determined low frequency signal strength value against a predetermined threshold, and determining if the fob is inside the cabin of the vehicle based on the comparison; and a vehicle engine immobilizer responsive to said controller, said controller controlling said immobilizer in response to said comparison;

wherein said controller includes a prestored low frequency energy map and wherein said controller makes said determination if the fob is inside the cabin of the vehicle by comparing the determined low frequency signal strength signal value against the prestored low frequency energy map.

2. The apparatus of claim 1 wherein said controller disables said immobilizer if said comparison indicates that said fob is inside the vehicle cabin.

3. The apparatus of claim 1 wherein the fob includes an electronic vehicle key having a low frequency antenna for receiving said low frequency signal in three coordinates.

4. The apparatus of claim 1 wherein the radio frequency response signal includes a unique identification code along with the signal strength value portion, and wherein the vehicle engine immobilizer is connected to the vehicle ignition system, said controller enabling the vehicle ignition system only if the identification code matches a prestored code and the comparison indicates the vehicle electronic key is within the vehicle cabin.

5. An apparatus for locating a vehicle electronic key for a vehicle, the apparatus comprising:
- a fob having low frequency antenna for detecting low frequency energy in three coordinates and determining a low frequency signal strength value of the low frequency energy, said fob further including means for providing a radio frequency response signal that includes the determined low frequency signal strength value;
- a low frequency transmitter having an antenna located at or near a central location of a cabin of the vehicle for providing the low frequency energy substantially throughout and substantially within the cabin of the vehicle;
- a controller for storing a premeasured low frequency signal energy map of the vehicle cabin, for comparing the determined low frequency signal strength value against the stored premeasured low frequency energy map of the vehicle cabin, and, in response thereto, for determining if the fob is inside of the cabin of the vehicle; and
- a vehicle engine immobilizer responsive to said controller, said controller controlling said immobilizer in response to said comparison.

6. The apparatus of claim 5 wherein said controller disables the vehicle engine via said immobilizer if said comparison indicates that said fob is within the vehicle cabin.

7. An apparatus for locating a vehicle electronic key for a vehicle, the apparatus comprising:
- a low frequency transmitter having an antenna located at or near a central location of a cabin of the vehicle for transmitting a low frequency energy signal substantially throughout and substantially within the cabin of the vehicle;
- an electronic vehicle key for, when inside the cabin of the vehicle, receiving the transmitted low frequency energy signal, determining a signal strength value of the received low frequency energy signal, and transmitting a radio frequency signal having a unique identification code and a field strength code indicative of the determined signal strength value of the received low frequency energy signal; and
- a controller connected to the vehicle ignition system for monitoring the radio frequency signal, determining from the field strength code if the electronic key is inside the cabin of the vehicle, and enabling the vehicle ignition system only if the identification code matches a prestored code and it is determined that the electronic key is inside of the vehicle cabin;
- wherein said controller includes a prestored low frequency energy map and wherein said controller makes said determination if the fob is inside the cabin of the vehicle by comparing the determined field strength code against the prestored low frequency energy map.

* * * * *